United States Patent [19]

Heck

[11] Patent Number: 4,489,525
[45] Date of Patent: Dec. 25, 1984

[54] REPLACEABLE SPINDLE LOCK SYSTEM

[75] Inventor: Edward A. Heck, Westminster, Md.

[73] Assignee: Black & Decker Inc., Newark, Del.

[21] Appl. No.: 522,010

[22] Filed: Aug. 11, 1983

[51] Int. Cl.$^3$ .......................... B24B 23/00; G05G 5/06
[52] U.S. Cl. ..................................... 51/170 R; 74/527;
408/4; 408/710; 279/1 K; 188/69
[58] Field of Search .......... 51/170 R, 170 T, 170 PT;
74/411.5, 527; 408/4, 710; 279/1 K; 188/69, 31,
60; 173/164

[56] References Cited

U.S. PATENT DOCUMENTS

| | | |
|---|---|---|
| 1,270,808 | 7/1918 | Franklin . |
| 2,101,305 | 12/1937 | Albertson . |
| 2,211,216 | 8/1940 | Oster . |
| 2,267,781 | 12/1941 | Albertson . |
| 2,807,732 | 9/1957 | Kurtovich ........................ 173/164 |
| 3,021,723 | 2/1962 | Happe . |
| 3,899,852 | 8/1975 | Batson . |

Primary Examiner—Roscoe V. Parker
Attorney, Agent, or Firm—Ronald B. Sherer; Harold Weinstein; Edward D. Murphy

[57] ABSTRACT

A replaceable spindle locking system for a power tool enables an operator to replace a lock member without disassembling the tool. An externally-accessible retaining member, such as a washer, is trapped between a ledge located in a housing recess and a shoulder formed on the lock member, which is normally spring-biased out of engagement with a driven member. The coaction of these elements simultaneously and releasably normally retains both the lock member and the retaining member connected to the housing. When it is desired to replace the lock member, the operator depresses the lock member against the urging of the spring until the lock member is out of retaining engagement with the retaining member. Then the retaining member is slideably moved out of engagement with the lock member, thereby allowing the operator to quickly remove it.

21 Claims, 9 Drawing Figures

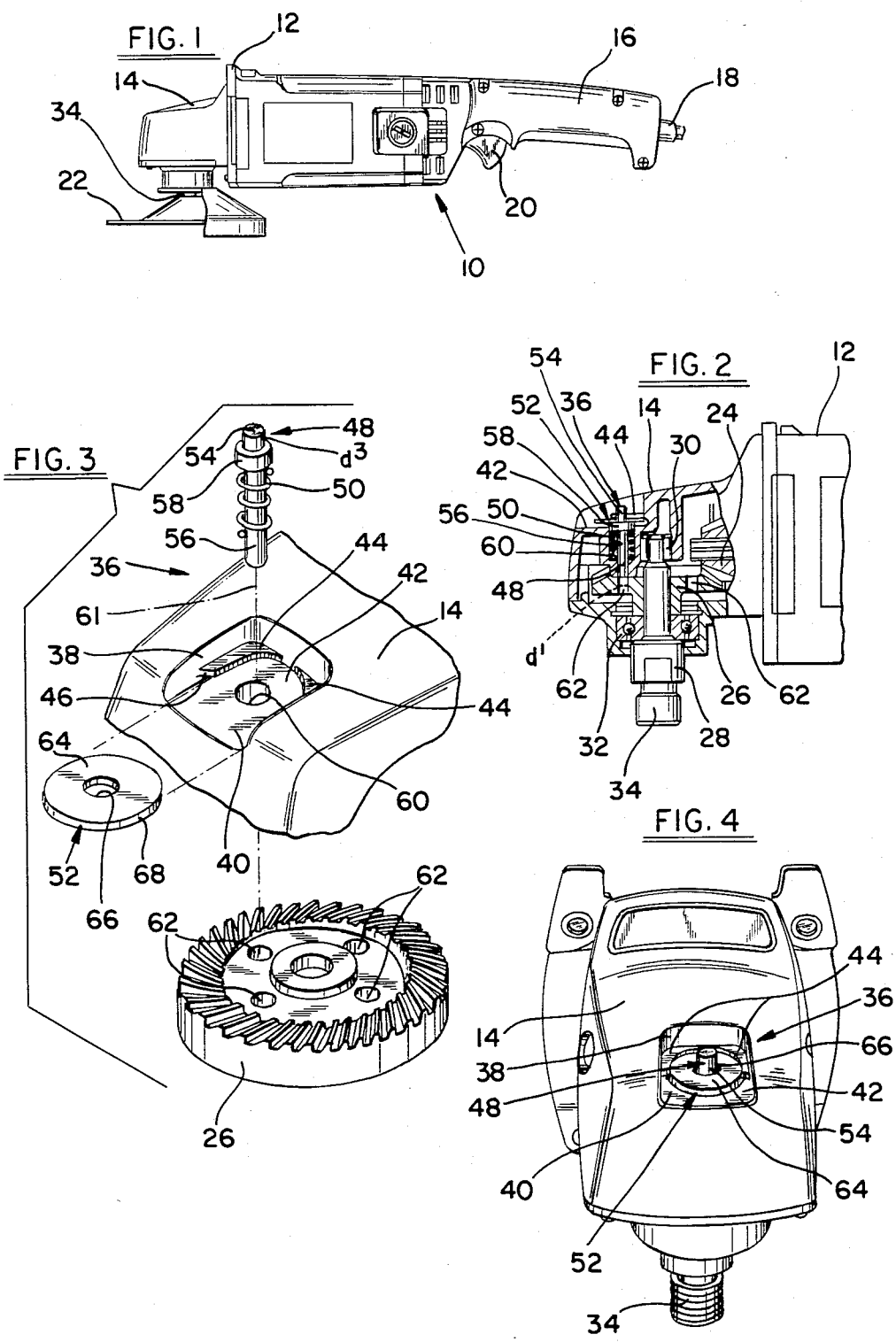

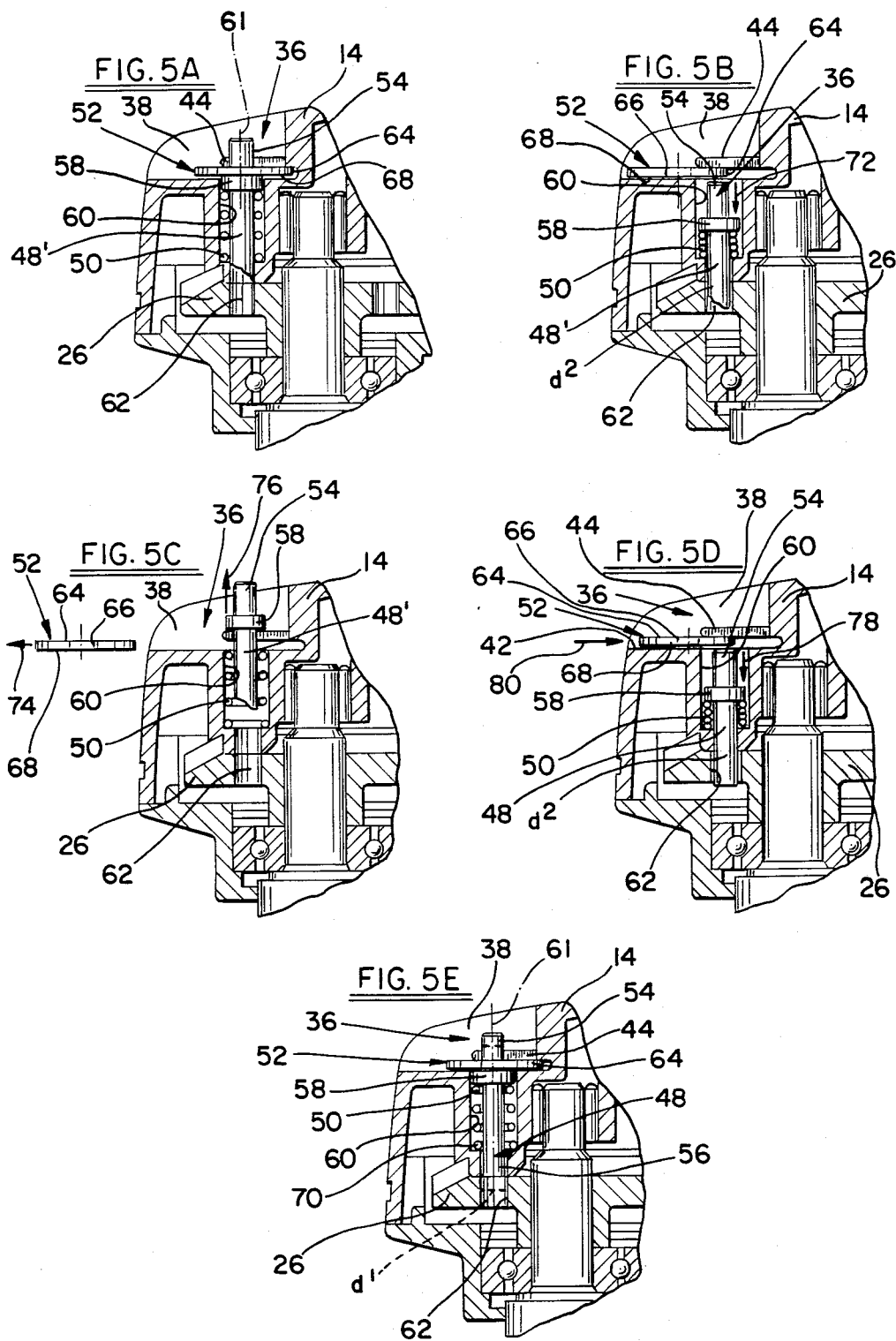

REPLACEABLE SPINDLE LOCK SYSTEM

BACKGROUND OF THE INVENTION

1. Field of the Invention

This invention relates to spindle locking systems for power tools, and particularly to a replaceable spindle lock system for an abrading tool in which a lock member is normally biased out of engagement with a driven member. The lock member is removed by depressing it inwardly towards the driven member against the urging of biasing means mounted in the tool housing, until an exposed end of the lock member clears an externally-accessible retaining member. The retaining member is then moved out of engagement with the lock member, thereby allowing the lock member to be removed.

2. Description of The Prior Art

When it is desired to change a driven element of a power tool, (as in the abrading member for a grinder) it is necessary to retrain the driven element from rotation relative to the tool. A spindle lock is often used to lock the driven element against movement. Occasionally the spindle lock is damaged upon engagement with the driven element. Then under conventional systems it becomes necessary to replace several parts of the spindle lock assembly, often involving disassembly of the power tool adjacent the spindle lock. An example of such a system uses a lock pin which is depressed against the force of a spring to engage a rotatable gear. The lock pin is retained in place by a snap ring mounted into an annular groove on the lock pin within the tool housing interior; therefore the tool must be disassembled to replace the lock pin.

Another exaple of a spindle lock is one in which a spindle lock pin has an annular shoulder formed thereon which is trapped by an internal ledge formed in the tool gear case housing. Again the tool must be disassembled to remove the lock pin.

The present invention solves these problems by introducing a lock member and an external retaining member which coact to keep one another connected to the tool, until the lock member is depressed a predetermined distance into the housing.

SUMMARY OF THE INVENTION

A replaceable spindle lock system includes a lock member removably connected to a housing member and engageable to lock a driven element against motion relative to the housing member, and further includes retaining means accessible from outside the housing member for releasably maintaining the lock member connected to the housing member.

It is an object of the present invention to provide a replaceable spindle lock system for a power tool which overcomes the prior art disadvantages; which is simple, economical, and reliable; which includes a housing member defining a lock channel and having a locking surface or retaining portion formed in a recess in the housing exterior; which locking surface being defined by a bifurcated ledge located in a first plane; which intersects the axis of a removable locking member slideably movable in the lock channel; which has an exposed first end and a second end, the second end being engageable with a lock cavity formed in a driven element, such as a gear rotatably connected to a motor mounted in the power tool; which locking member being a cylinder movable a first predetermined distance and a longer, second predetermined distance in the housing towards the driven element; which cylinder includes a flange portion or abutment, such as an annular shoulder formed thereon a third predetermined distance from the first end; which normally engages retaining means for maintaining the lock member in the housing when the lock member is out of engagement with the driven element, but selectively permitting removal of the lock member upon engagement of the lock member with the driven element; which engagement requires movement of the lock member the second predetermined distance; which retaining means being operatively associated with biasing means for normally urging the lock member out of engagement with the driven element and for maintaining the retaining means in engagement with the housing member locking surface; which biasing means including a spring coaxial with the lock member, and engaging the lock member shoulder; which retaining means including a retaining member slideably movable in the housing member recess and being selectively movable between the housing member retaining portion and the lock member shoulder in a second plane intersecting the first axis; which retaining member being a disc having an aperture larger than the diameter of the exposed first end of the locking member but smaller than the outer diameter of the lock member annular shoulder; and the third predetermined distance of the annular shoulder from the lock member first end being selected to permit disengagement of the lock member first end from the retaining member aperture when the lock member has moved the second predetermined distance, but to maintain the lock member in engagement with the retaining member aperture until the lock member has moved said second predetermined distance.

A further object of the present invention is to provide a method for replacing a damaged or defective spindle lock of a power tool, including the steps of depressing the lock member inwardly towards the housing against the urging of the biasing means until the lock member becomes disengaged from retaining engagement with the retaining member; moving the retaining member until the lock member is freely removable from the housing; removing the damaged lock member; providing a replacement lock member; inserting the replacement lock member into the tool; depressing the replacement lock member inwardly towards the tool against the urging of the biasing means until the retaining member can engage the lock member in retaining engagement; moving the retaining member into a retaining position in the tool; and releasing the replacement lock member so that the biasing means urges the lock member into retaining engagement with the retaining member.

BRIEF DESCRIPTION OF THE DRAWINGS

FIG. 1 is a side elevational view of a power tool embodying the present invention with a portion of the grinding wheel guard cut away for clarity.

FIG. 2 is an enlarged elevational sectional detail view, partially cut away, of the drive spindle subassembly of the power tool in FIG. 1.

FIG. 3 is an exploded perspective detail view of the spindle locking system of the present invention.

FIG. 4 is a front elevational perspective view of the spindle locking system of the present invention with a retaining member in place.

FIGS. 5A through 5E are elevational sequential sectional detail views of the spindle lock system of the present invention, in which:

FIG. 5A shows a damaged lock member retained in place in the housing;

FIG. 5B shows the retaining member moved transverse to the lock pin axis after the lock member is depressed out of locking engagement with the retaining member;

FIG. 5C shows the retaining member moved out of engagement from the lock member, permitting the lock member to be removed therefrom;

FIG. 5D shows a replacement lock member inserted into the housing against the urging of the biasing means, such that the retaining member can be inserted into the housing; and FIG. 5E shows the replacement lock member retained in place by the retaining member, and the retaining member in turn retained in place by the lock member.

DESCRIPTION OF PREFERRED EMBODIMENT

A power tool having a spindle locking system of the present invention is referred to generally as 10 in FIG. 1. The power tool 10 shown is a portable grinder having a tool housing 12 including a housing member 14 at the front of the housing 12 and a handle portion 16 containing a line cord 18 electrically connected to switch 20. The switch 20 is in turn electrically connected to an electric motor (not shown) to rotatably drive an abrading element 22.

Referring now to FIG. 2, the housing member 14 encloses a drive pinion 24 driven by the motor (not shown). The drive pinion 24 drives a driven element or member, such as gear 26, which is fixedly connected to tool spindle 28. The tool spindle 28 is rotatably journaled in bearings 30 and 32 and is drivingly connected at its exposed portion 34 to the abrading member 22 shown in FIG. 1.

The spindle lock system of the present invention is shown generally as 36 in FIGS. 2, 3, 4 and 5A through 5E. Referring to FIGS. 2, 3 and 4, the spindle lock system 36 includes an external recess 38 open at one end 40 thereof formed in the upper front portion of the housing member 14 and including a bottom portion 42. A housing retaining portion or locking surface is defined by a bifurcated ledge 44 open at one end 46 adjacent the open end 40 of the external housing recess 38, and lying in a first plane. The spindle locking system 36 further includes a lock member 49, biasing means 50 and retaining means 52.

Referring to FIGS. 2, 3 and 5E, the lock member 48 is an elongaged cylinder having a first or exposed end 54, a second or locking end 56 and a flange portion defined by an annular shoulder 58. Referring to FIG. 5E, the lock member 48 is slideably movable in a lock channel 60 along an axis 61 a first distance d' (shown in phantom in FIGS. 2 and 5E) from its normal position, to engage one of a plurality of driven element lock cavities 62, thereby retaining or locking the driven element 26 against movement relative to the housing member 14, the lock cavities 62 being registrable with lock channel 60. Also, as shown in FIG. 5D the lock member 48 is movable a second, longer predetermined distance $d^2$ from its normal position, along the lock channel 60 so that the lock member exposed end 54 is substantially flush with the recess bottom portion 42. Accordingly, as shown in FIG. 3, the annular shoulder 58 is located a third predetermined distance $d^3$ from the exposed end 54, which is related to distance $d^2$.

Now with respect to FIGS. 2, 3 and 4, the retaining means 52 includes a retaining member such as a disc or washer 64 defining an aperture 66 and having a lower surface 68. The retaining member 64 is slideably mounted in the housing member external recess 38 in a second plane. Referring to FIGS. 3 and 4, the retaining member 64, when fully mounted in the tool 12, is trapped between the recess bottom portion 40 and the bifurcated ledge 44, with the exposed end 54 of the lock member 48 engaging the retaining member 64 via aperture 66. Thus both the bifurcated ledge 44 and the retaining member 64 intersect the lock member axis 61, in their respective first and second planes.

FIG. 5E shows that the biasing means 50 includes a coil spring coaxially mounted in the lock channel 60 about the lock member 48, such that one end bears against lock pin shoulder 58, and the other end is trapped against a reduced-diameter portion 70 of the lock channel 60. As a result the biasing means 50 normally urges the lock member 48 out of engagement with the lock cavity 62 of driven member 26, and further normally urges the lock member 48 into retaining engagement with the retaining member 64. The shoulder 58 bears against retaining member 64, which in turn is retained by ledge 44 against vertical movement and by lock member 48 against transverse movement. Thus spring 50 is part of a means for simultaneously maintaining both the lock member 48 and the retaining member 64 connected to the housing 12, and for selectively releasing the lock mmeber 48 from the housing 12 respective to operator actuation of the lock member 48.

This coaction of the ledge 44, retaining member 64 and the spring-biased lock member 48 is illustrated in FIGS. 5A through 5E, which show the sequence of operation of the present invention. In FIG. 5A, a damaged lock member 48' is automatically retained in the housing 12 by the just-described coaction of the elements of the spindle lock system 36. When it is desired to replace the damaged lock member 48', the operator depresses the lock member 48' against the urging of the biasing means 50, as shown by arrow 72 in FIG. 5B, until the first or exposed end 54 of lock member 48' is removed from locking or retaining engagement with retaining member aperture 66, the exposed end 54 being immediately below the retaining member lower surface 68. Still referring to FIG. 5B, with the lock member 48' depressed, the retaining member 64 is slideably moved transversely of the lock member 48. It can be seen that a portion of the retaining member 64 actually slides over the exposed end 54 of the lock member, thereby assisting in maintaining the lock member 48' out of locking engagement with retaining member 64. At this point, the lock member has travelled the second predetermined distance, $d^2$, being deeply inserted into the drive element lock cavity 62.

In FIG. 5C, the retaining member 64 has been moved far enough, in the direction shown by arrow 74, to allow the lock member 48' to be freely removed from the housing member 14, as shown by arrow 76.

As shown in FIG. 5D, when a replacement lock member 48 is provided, it is first inserted into the housing member 14, again, against the urging of the biasing means 50 in the direction shown by arrow 78, until the lock member exposed end 54 once again can clear the retaining member lower surface 68, the lock member having again travelled the second predetermined distance $d^2$ in the lock channel 54 and into engagement with driven member lock cavity 62. Then the retaining member 64 may be inserted in the direction shown by arrow 80 until its aperture 66 is once again in registration with lock channel 60.

In FIG. 5E, the lock member 48 is shown after being released by the operator, now once again, at the urging of the biasing means 50, automatically retaining the retaining member 64 in the housing and being retained therein in turn by the retaining member 64.

Thus both the retaining membet 64 and the lock member 48 are completely accessible to the operator from outside the housing, thereby precluding any necessity for disassembling the power tool to replace the lock member 48 (or the retaining member 64). Also the assembled spindle lock system maintains both the lock member exposed end 54, as well as the retaining member 64, hidden within the housing member recess 38.

It will be understood that various changes in the details, materials, arrangements, methods, parts and operating conditions which have been herein described and illustrated in order to explain the nature of the invention may be made by those skilled in the art within the principles and scope of the invention.

What is claimed is:

1. A locking system for a power tool, comprising:
   (a) a housing;
   (b) a driven element operatively connected to the housing;
   (c) a lock member removably connected to the housing and engageable to lock the driven element against motion relative to the housing;
   (d) retaining means accessible from outside the housing for releasably maintaining the lock member connected to the housing;
   (e) the housing defining an external recess open at one end thereof and a lock channel formed therein:
   (f) the lock member being an elongated body slideably movable in the lock channel;
   (g) the retaining means including a retaining member defining an aperture selectively engageable with the lock member; and
   (h) the retaining member being slideably movable in the recess and being selectively removable from the recess open end responsive to disengagement of the lock member from the retaining member aperture.

2. The combination claimed in claim 1, wherein:
   (a) the retaining means further including a retaining portion formed in the housing recess;
   (b) the lock member having a shoulder formed thereon;
   (c) the retaining member being normally trapped between the housing retaining portion and the lock member shoulder; and
   (d) the shoulder being located on the lock member such that the lock member remains wholly within the recess when the retaining member engages the shoulder.

3. The combination claimed in claim 2, wherein:
   (a) the power tool being an abrading tool; and
   (b) the housing recess being located on the upper front portion of the abrading tool.

4. A spindle locking system for a power tool, comprising:
   (a) a housing including a retaining portion;
   (b) a driven element rotatably connected to the housing;
   (c) a removable lock member having a shoulder portion adjacent the housing retaining portion and operatively associated with the driven element;
   (d) a removable retaining member operatively associated with the retaining portion and the shoulder portion to reain the lock member in the housing;
   (e) the removable lock member including an elongated body and being slideably movable in the housing along a first axis;
   (f) the housing retaining portion being located in a first plane intersecting the first axis;
   (g) the retaining member being selectively movable, sandwiched between the housing retaining portion and the shoulder, in a second plane intersecting the first axis;
   (h) the lock member being a cylinder having an annular shoulder formed thereon and an exposed end above the annular shoulder;
   (i) the housing retaining portion being a bifurcated ledge open at one end;
   (j) the retaining member being a washer insertable under the ledge at the ledge open end; and
   (k) the cylinder exposed end normally protruding through the washer and the bifurcated ledge.

5. The combination claimed in claim 4, further comprising:
   (a) biasing means for normally urging the cylinder into engagement with the washer;
   (b) the washer having a lower surface; and
   (c) the washer being slideably removable from the bifurcated ledge upon movement of the cylinder exposed end below the lower surface of the washer, against the urging of the biasing means.

6. The combination claimed in claim 5, wherein the biasing means further normally maintaining both the cylinder and the washer connected to the housing.

7. A replaceable spindle lock for a power tool, comprising:
   (a) a housing member;
   (b) a driven element rotatably connected to the housing;
   (c) a lock member removably connected to the housing and engageable with the driven element;
   (d) biasing means for normally urging the lock member out of engagement with the driven element; and
   (e) retaining means operatively associated with the biasing means for maintaining the lock member in the housing when the lock member is out of engagement with the driven element but selectively permitting removal of the lock member upon engagement of the lock member with the driven element.

8. A method for replacong a damaged or faulty spindle lock member of a power tool, the spindle lock member being movably mounted in the tool housing along an axis and being normally urged outwardly of the housing by biasing means, the power tool further including a retaining member normally engaging the lock member to retain the lock member in the housing, comprising the steps of:
   (a) depressing the lock member inwardly towards the housing against the urging of the biasing means until the lock member becomes disengaged from retaining engagement with the retaining member;
   (b) moving the retaining member until the lock member is freely removable from the housing; and
   (c) removing the lock member.

9. The method claimed in claim 8, further comprising the steps of:
(a) providing a replacement lock member;
(b) inserting the replacement lock member into the housing;
(c) depressing the replacement lock member inwardly towards the housing against the urging of the biasing means until the retaining member can engage the replacement lock member in retaining engagement;
(d) moving the retaining member into a retaining position at the housing; and
(e) releasing the elongated member so that the biasing means urges the elongated member into retaining engagement with the retaining member.

10. A power tool comprising:
(a) a housing defining a lock channel and having a locking surface formed on the housing exterior;
(b) a motor connected to the housing;
(c) a drive element drivingly connected to the motor and defining a lock cavity registrable with the lock channel;
(d) a lock member removably mounted in the lock channel and having a locking portion engageable with the drive element lock cavity;
(e) retaining means engageable with the locking surface for maintaining the lock member in the housing lock channel;
(f) biasing means, internal of the retaining means and operatively associated with the housing locking surface, for removably maintaining the retaining means in engagement with the housing locking surface.

11. The combination claimed in claim 10, wherein the biasing means further normally urges the locking member out of engagement with the drive element lock cavity.

12. The combination claimed in claim 10, wherein:
(a) the retaining means including a retaining member defining an aperture registrable with the lock channel; and
(b) the biasing means including a spring normally urging the lock member into engagement with the retaining member aperture.

13. The combination claimed in claim 2, wherein:
(a) the retaining member and lock member coacting to normally maintain the lock member in the channel against the urging of the spring; and
(b) the retaining member being removable from the housing open disengagement of the lock member from the retaining member.

14. The combination claimed in claim 13, wherein:
(a) the retaining means further including a flange portion formed on the lock member; and
(b) the retaining member normally being trapped between the housing locking surface and the lock member flange portion.

15. The combination claimed in claim 14, whrein:
(a) the housing lock channel having a reduced-diameter portion; and
(b) the spring being located in the lock channel coaxial with the lock member, and being trapped between the lock member flange portion and the lock channel reduced-diameter portion.

16. The combination claimed in claim 15, wherein:
(a) the housing including a recess formed in the housing exterior and a ledge portion therein defining the housing locking surface.

(b) the recess including a bottom portion, and
(c) the retaining member being a disc slideably mounted between the ledge portion and the bottom portion.

17. A power tool, comprising:
(a) a housing;
(b) a motor connected to the housing;
(c) a driven element rotatably connected to the motor;
(d) a lock member slideably mounted in the housing for movement along a predetermined distance in the housing and being engageable with the driven element;
(e) retaining means operatively associated with the lock member and the housing for normally retaining the lock member in the housing, and for releasing the lock member from the housing upon movement of the lock member the predetermined distance in the housing;
(f) the retaining means including a retaining member slideably mounted in the housing in releasable engagement with the lock member, an abutment formed on the lock member engageable with the retaining member, and biasing member acting against the abutment for normally urging the lock member into engagement with the retaining member; and
(g) the biasing means further normally urging the lock member out of engagement with the driven member.

18. The combination claimed in claim 17, wherein:
(a) the housing including a ledge and a recessed portion formed in the housing exterior;
(b) the lock member being an elongated cylinder having a predetermined diameter;
(c) the abutment being an annular shoulder formed on the lock member a predetermined distance from an end thereof and having a predetermined diameter greater than the diameter of the cylinder;
(d) the retaining member being a disc defining an aperture having a diameter greater than the cylinder diameter but less than the annular shoulder diameter;
(e) the disc normally being located between the housing ledge and recessed portion; and
(f) the end of the lock member normally being engaged within the disc aperture with the cylinder annular shoulder engaging the disc, thereby maintaining the lock member in place and simultaneously retaining the disc member connected to the housing.

19. A power tool, comprising:
(a) a housing;
(b) a motor connected to the housing;
(c) a driven element rotatably connected to the motor;
(d) a lock member slideably mounted in the housing for movement along a predetermined distance in the housing and being engageable with the driven element;
(e) retaining means operatively associated with the lock member and the housing for normally retaining the lock member in the housing, and for releasing the lock member from the housing upon movement of the lock member the predetermined distance in the housing;
(f) the lock member being movable a first predetermined distance and a second predetermined distance in the housing in a direction towards the driven element; and (g) the first predetermined distance being sufficient to permit the lock member to engage the driven element, and the second predetermined distance being sufficient to release the lock member from the housing.

20. The combination claimed in claim 19, wherein:
(a) the lock member having a first end and a second end, and having a shoulder formed thereon a third predetermined distance from the first end;
(b) the second predetermined distance being greater than the first predetermined distance;
(c) the retaining means including a retaining member having an aperture normally engaged by the lock member first end and being normally engaged by the shoulder, and
(d) the third predetermined distance being selected to permit disengagement of the first end from the retaining member aperture when the lock member has moved the second predetermined distance, but to maintain the lock member in engagement with the retaining member aperture until the lock member has moved said second predetermined distance.

21. A spindle locking system for a power tool, comprising:
(a) a housing;
(b) a driven element rotatably connected to the housing;
(c) a lock member being movably connected to the housing responsive to operator actuation and being engageable to lock the driven element in place;
(d) a retaining member being movably mounted on the housing and being operatively connected to the lock member; and
(e) means for simultaneously maintaining both the lock member and the retaining member connected to the housing and for selectively releasing the lock member from the housing responsive to operator actuation of the lock member.

* * * * *